United States Patent [19]

Parulski et al.

[11] Patent Number: 5,040,068
[45] Date of Patent: Aug. 13, 1991

[54] ELECTRONIC IMAGING APPARATUS WITH INTERCHANGEABLE PICKUP UNITS

[75] Inventors: Kenneth A. Parulski; Michael C. Moorman, both of Rochester, N.Y.

[73] Assignee: Eastman Kodak Company, Rochester, N.Y.

[21] Appl. No.: 458,861

[22] Filed: Dec. 28, 1989

[51] Int. Cl.$^5$ .............................................. H04N 5/30
[52] U.S. Cl. .................................. 358/209; 358/909; 358/335; 358/150
[58] Field of Search ............... 358/909, 906, 905, 335, 358/150, 110, 209, 98; 360/33.1, 35.1

[56] References Cited

U.S. PATENT DOCUMENTS

| | | |
|---|---|---|
| 4,130,834 | 12/1978 | Mender et al. |
| 4,163,256 | 7/1979 | Adcock |
| 4,302,776 | 11/1981 | Taylor et al. |
| 4,471,382 | 9/1984 | Toydda et al. |
| 4,524,381 | 6/1985 | Konishi |
| 4,527,205 | 7/1985 | Konishi |
| 4,633,293 | 12/1986 | Powers |
| 4,663,661 | 5/0587 | Weldy |
| 4,691,253 | 9/1987 | Silver |
| 4,714,962 | 12/1987 | Levina |
| 4,746,990 | 5/1988 | Katoh et al. ........................... 358/906 |
| 4,814,811 | 3/1989 | Saito et al. |
| 4,819,101 | 4/1989 | Lemelson ............................... 358/906 |
| 4,860,113 | 8/1989 | Miyamoto et al. ................. 358/909 |
| 4,862,258 | 8/1989 | Kidawara et al. ................... 358/98 |
| 4,866,516 | 9/1989 | Hibino et al. ........................ 358/98 |
| 4,873,580 | 10/1989 | Katoh et al. ....................... 358/335 |

FOREIGN PATENT DOCUMENTS

0225408 2/1985 Japan.

Primary Examiner—John K. Peng
Assistant Examiner—Tuan V. Ho
Attorney, Agent, or Firm—David M. Woods

[57] ABSTRACT

Electronic Imaging Apparatus is partitioned into separable modular units including an image pickup unit (4a) attachable to an image recording unit (2). The pickup unit (4a) is selected from a plurality of pickup units (4a, 4b), each producing image signals from an image sensor (6, 70, 71) uniquely devoted to the acquisition of a particular type of image (e.g., high resolution vs. low resolution, color vs. monochrome, NTSC motion vs. PAL motion). By providing an identifying signal in connection with the pickup unit, the characteristics of the sensor (6) are specified to the recording unit. More specifically, the recording unit includes a buffer (36) for storing the image signals, a processor (40) for controlling the operation of the recording unit, including the buffer, and interface circuitry (10, 32) for responding to the identifying signal and enabling operation of the processor (40) according to the characteristics of the attached image pickup unit (4a).

25 Claims, 5 Drawing Sheets

ELECTRONIC IMAGING APPARATUS WITH INTERCHANGEABLE PICKUP UNITS

BACKGROUND OF THE INVENTION

1. Technical Field

This invention pertains to the field of electronic imaging and, more particularly, to electronic imaging apparatus separable into a plurality of modular components.

2. Background Art

Various modular configurations for electronic cameras have been disclosed in the prior art. Each configuration tries to combine only the necessary components, depending on their intended use, so as to reduce the size and weight of the camera and to provide greater ease in its operation. For instance, European Patent Application No. 225,408 (published June 16, 1987) discloses an electronic still camera that includes three detachable units, namely, a photographing unit, a record/playback unit and a video picture unit. In addition, an optical monitor can be substituted for the video picture unit and a dubbing unit (with dual recording drives) can replace the record/playback unit. Another modular still system is shown in U.S. Pat. No. 4,714,962, including a portable electronic camera, a portable light source, a portable additional memory, and a portable image previewer and image processor. These modular components may be carried about (e.g., in a briefcase) in separated form, and then interconnected together as needed.

Modularity in a motion picture setting often takes the customary form, as shown in U.S. Pat. No. 4,819,101, of separate camcorder elements (separable camera and recorder). A similar approach allows a single electronic system to be used for both still and motion picture photography. For example, in U.S. Pat. No. 4,527,205, a camera head, having an image pickup member, a taking lens system, and a shutter, is selectively mounted to either a still camera body or a motion picture camera body. Also, in U.S. Pat. No. 4,814,876, an electronic camera unit interconnects either with a still image recorder or, via a special adapter detachably coupled to the electronic camera unit, with a motion video recorder.

In some cases, modularity is an adjunct of using either a conventional photographic film or a video imaging system in relation to the same photographic instrument. For instance, in U.S. Pat. No. 4,814,811, a still camera system includes a single lens reflex body for carrying either a film back for supporting conventional silver halide film or a still video back having a solid state image pickup device and a disc recording system. (Of course, it is widely known that conventional photographic cameras can employ a variety of film backs for different films and/or applications.)

The solid state image sensor has characteristically been employed in such modular systems as a singular element for providing an electronic image for every application. If, as in U.S Pat. No. 4,691,253, both high and low resolution is desired (for recording continuous motion in comparatively low resolution and for recording still scenes in comparatively high resolution), a solid state image sensor having sufficient photosites for the more demanding use (i.e., the higher resolution) is specified. Applications with incompatible video requirements, e.g., color or monochrome rendition, ordinarily require use of entirely separate photographic instruments, one devoted to each requirement.

SUMMARY OF THE INVENTION

Modularity to date has focused on utilization and evaluation of the acquired image, namely, on different recording systems (still vs. motion), different previewing systems (optical vs. electronic), different display systems (high vs. low resolution), and so on. This has led to the aforementioned size and weight advantages, as well as to greater ease of operation. By extending the concept of modularity to image acquisition, further cost and additional convenience advantages may be obtained as the photographic apparatus is tailored for a specific image acquisition application. These advantages are obtained according to the invention by partitioning the electronic imaging apparatus into separable modular units including an interchangeable image pickup unit attachable to an image recording unit, wherein the image pickup unit is selected from a plurality of such pickup units. Each pickup unit includes an image sensor, means for providing the sensor with a timing signal for clocking an image signal from the sensor, and means for providing an identifying signal that identifies an image pickup unit according to the characteristics of the image sensor included therewith.

The image recording unit includes means for storing the image signals, a processor means for controlling the operation of the image recording unit, and means responsive to the identifying signal for enabling operation of the processor means according to the sensor characteristics of the attached image pickup unit.

Typical sensor characteristics that adapt to modular separation include the resolution of the image sensor (high resolution vs. low resolution), the spectral sensitization of the image sensor (e.g., color vs. monochrome sensitization), the light sensitivity of the image sensor (e.g., large vs. small photosites), and so on. The control exercised of the image recording unit can relate, e.g., to the loading of the buffer or the operation of an exposure control circuit in the recording unit. Various means may be used to provide the identifying signal, ranging from, for example, a simple tactile or electrically-sensed code on the image pickup unit to a digital header accompanying the image signal generated by the image sensor.

BRIEF DESCRIPTION OF THE DRAWINGS

The invention will be described in relation to the drawings, in which.

DETAILED DESCRIPTION OF THE PREFERRED EMBODIMENT

Because electronic still or motion cameras employing charge-coupled device (CCD) sensors are well known, the present description will be directed in particular to elements forming part of, or cooperating more directly with, apparatus in accordance with the present invention. Elements not specifically shown or described herein may be selected from those known in the art.

Figures 1, 6:
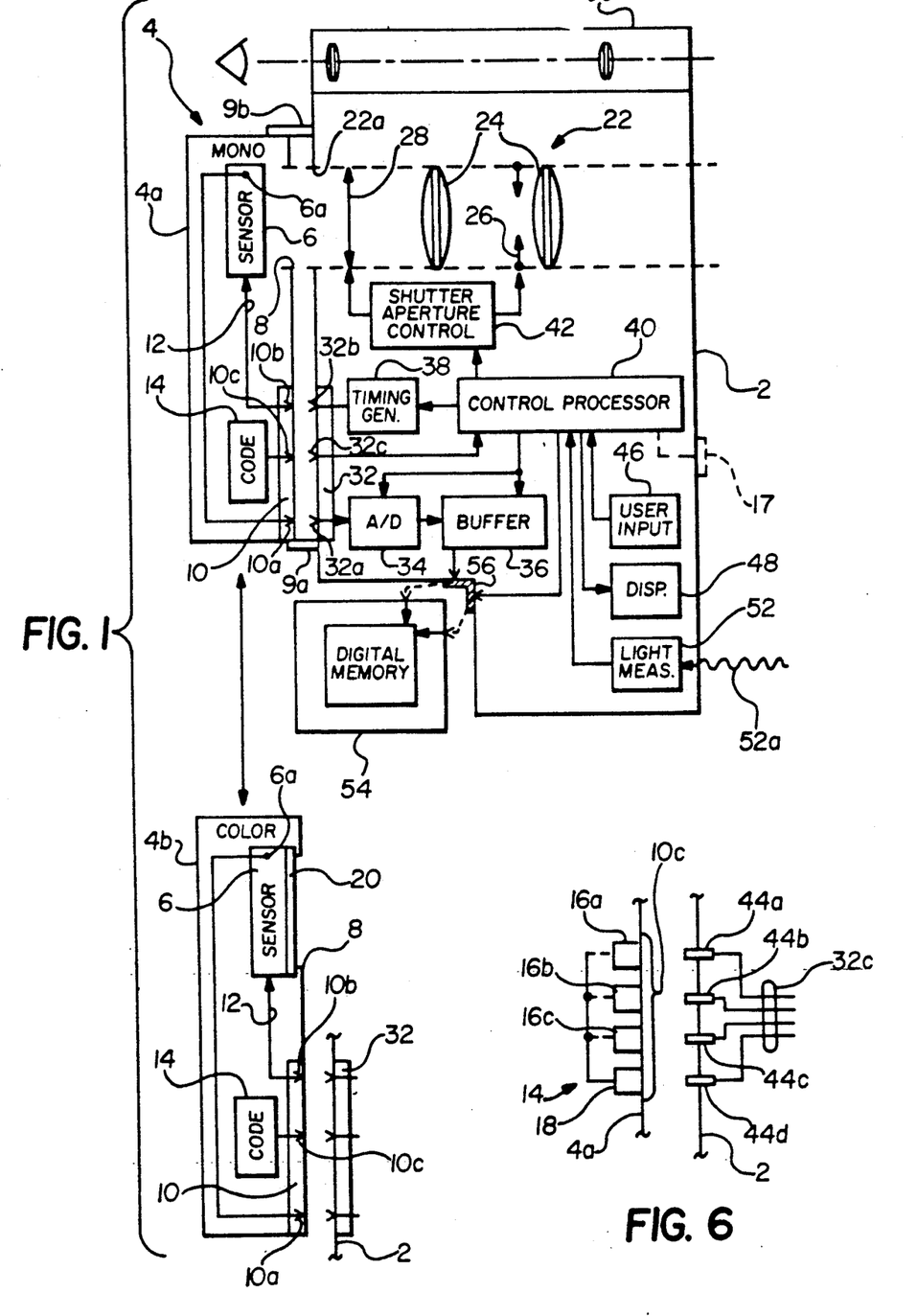
FIG. 1 is a block diagram of electronic imaging apparatus partitioned according to the invention into an image recording unit and interchangeable pickup units for acquisition of either color or monochrome images.
FIG. 6 is a diagram of one technique for encoding the characteristics of an image pickup unit.

Referring initially to FIG. 1, electronic imaging apparatus is divided generally into an image recording unit 2 and a pair of interchangeable image pickup units 4a and 4b, one each for the acquisition of monochrome and color images. Turning to the monochrome image pickup unit first, the pickup unit 4a includes an image sensor 6 positioned astride an opening 8 to receive image light traversing the recording unit 2. A pair of latches 9a and 9b (shown schematically in the figures) secure the pickup unit 4a in light-tight relationship with the recording unit 2. Such latches may be the conventional light-tight hinges and locks used to secure a (film) back to a conventional single lens reflex camera. The image pickup unit 4a supports a terminal block 10, which includes three terminal connections 10a, 10b, and 10c for communicating with the image recording unit 2. It is to be understood that each terminal connection may include more than one distinct line, depending on the requirements of the data and/or signals being communicated.) The sensor 6, which includes a two-dimensional array of photosites corresponding to picture elements of the image, is a conventional charge-coupled device (CCD) using either well-known interline transfer or frame transfer techniques. An exemplary sensor is the 1320(H) x 1035(V) - Element Full Frame CCD Imager, model KAF-1400, manufactured by the Eastman Kodak Company. The sensor 6 is exposed to image light so that analog image charge information is generated in respective photosites. The charge information is applied to an output diode 6a, which converts the charge information to analog image signals corresponding to respective picture elements.

In this first embodiment, the analog image signals are applied to the terminal 10a located in the terminal block 10. The horizontal and vertical clocks needed for driving the image sensor 6 are input through the terminal 10b and over (one or more) line(s) 12 to the image sensor 6. Coding means 14 provides an identifying signal to the terminal 10c for identifying the image pickup unit 4a according to the characteristics of the image sensor 6 included therewith; that is, the identifying signal signifies that the image pickup unit 4a provides a monochrome signal. The code may take many familiar forms such as, for example, a simple binary code specified by a series of metal pads 16a, 16b, 16c (see FIG. 6) that are optionally connected to a metal grounding pad 18 depending on the type of characteristics encoded. Alternatively, tactile bumps, notches, ridges, etc. may engage mechanical switches (not shown) on the recording unit 2.

The image pickup unit 4a is replaced with the image pickup unit 4b when acquisition of a color image is desired. Besides the image sensor 6, the coding means 14, and the terminal block 10, the image pickup unit 4b additionally includes a color filter array 20 positioned over the photosensitive surface of the image sensor 6 in the path of image light. A typical color filter array is the "three green" array described in U.S. Pat. No. 4,663,661. The sensor 6, when clocked from the terminal 10b, consequently provides a sequence of color-dependent signals to the terminal 10a corresponding to the particular color pattern of the array 20. Accordingly, the identifying signal provided by the coding means 14 signifies that the image pickup unit 4b provides a color image signal. In addition, the identifying signal may specify the type of color filter array pattern (e.g., the "three green" pattern), as this information is useful in the subsequent signal processing to separate the respective colors.

The image recording unit 2 includes an exposure section 22 for directing image light from a subject (not shown) through an opening 22a generally coextensive with the opening 8 in the image pickup unit 4a (or 4b). The exposure section includes conventional optics 24 for directing the image light through a diaphragm 26, which regulates the optical aperture, and a shutter 28, which regulates exposure time. The thus-regulated image light is directed upon the image sensor 6. An optical viewfinder 30 enables a user to point the image recording unit 2 generally toward the subject. A terminal block 32, including terminals 32a, 32b, and 32c, generally corresponds to the terminal block 10 on the image pickup unit 4a. When the pickup unit 4a (or 4b) is attached to the recording unit 2, the respective circuits are completed between pickup terminals 10a, 10b, 10c and recording terminals 32a, 32b, 32c, which forms an interface for transferring signals between the pickup unit 4a (or 4b) and the recording unit 2. The analog image signals present on the terminal 32a are applied to an A/D converter 34, which generates a digital image signal from the analog input signal for each picture element. The digital signals are applied to an image buffer 36, which is a random access memory (RAM) with storage capacity for all, or a part of, a still picture. The horizontal and vertical clocks needed for driving the sensor 6 are generated by a timing generator 38 and applied to the terminal 32b. The identifying signal present on the terminal 32c is applied to a control processor 40. As shown in FIG. 6, the terminal 32c may comprise a plurality of metal contacts 44a, 44b, 44c, 44d that contact the metal pads 16a, 16b, 16c, and 18 and relay the electrical information to the control processor 40.

The control processor 40 decodes the identifying signal and generally controls the recording unit 2 and the image pickup unit 4a (or 4b) by initiating and controlling exposure (by instructing the control element 42 to operate the diaphragm 26 and the shutter 28), by controlling operation of the timing generator 38, and by enabling the A/D converter 34 in conjunction with the image buffer 36 for each signal segment relating to a picture element. The control processor 40 also receives user instructions from a user input section 46, which includes at least a shutter release, and may further include exposure mode settings, manual exposure settings, overrides, and so on. Message information is output from the control processor 40 to a display section 48, which may display the exposure settings, exposure mode, and so on. In particular, the identity of the pickup unit (monochrome or color) is obtained from the identifying signal and output to the display section 48 for display as a corresponding message. The control processor 40 also calculates proper exposure conditions (shutter, aperture) based on the ambient light 52a sensed by a light measuring circuit 52 and the photographic speed of the image sensor 6 (as provided by or inferred from the identifying signal from the coding means 14).

The control processor 40 further directs the digitized image signals to a detachable memory module 54 via a connector 56. The memory module 54 may be tethered to the image recording unit 2 via a cable (not shown) or it may be fitted to mate with the connector 56 on the recording unit 2. An attractive embodiment for the memory module, particularly for direct attachment to the recording unit 2, is a static random access memory (SRAM) card, in the size, and form, of a credit card. A representative memory card is a 2 mega-byte static random access memory (SRAM) available from Mitsubishi Corp. (under the tradename "Melcard"). Alternatively, the memory module 54 may include a digital magnetic recorder (tape or disc) or an erasable optical disk. If suitable D/A conversion (not shown) and signal encoding (e.g., frequency modulation, not shown) are included either in the recording unit 2 proper or in the memory module 54, an analog signal can be recorded in the module 54 on suitable media (e.g., magnetic tape or disc).

Figure 2:
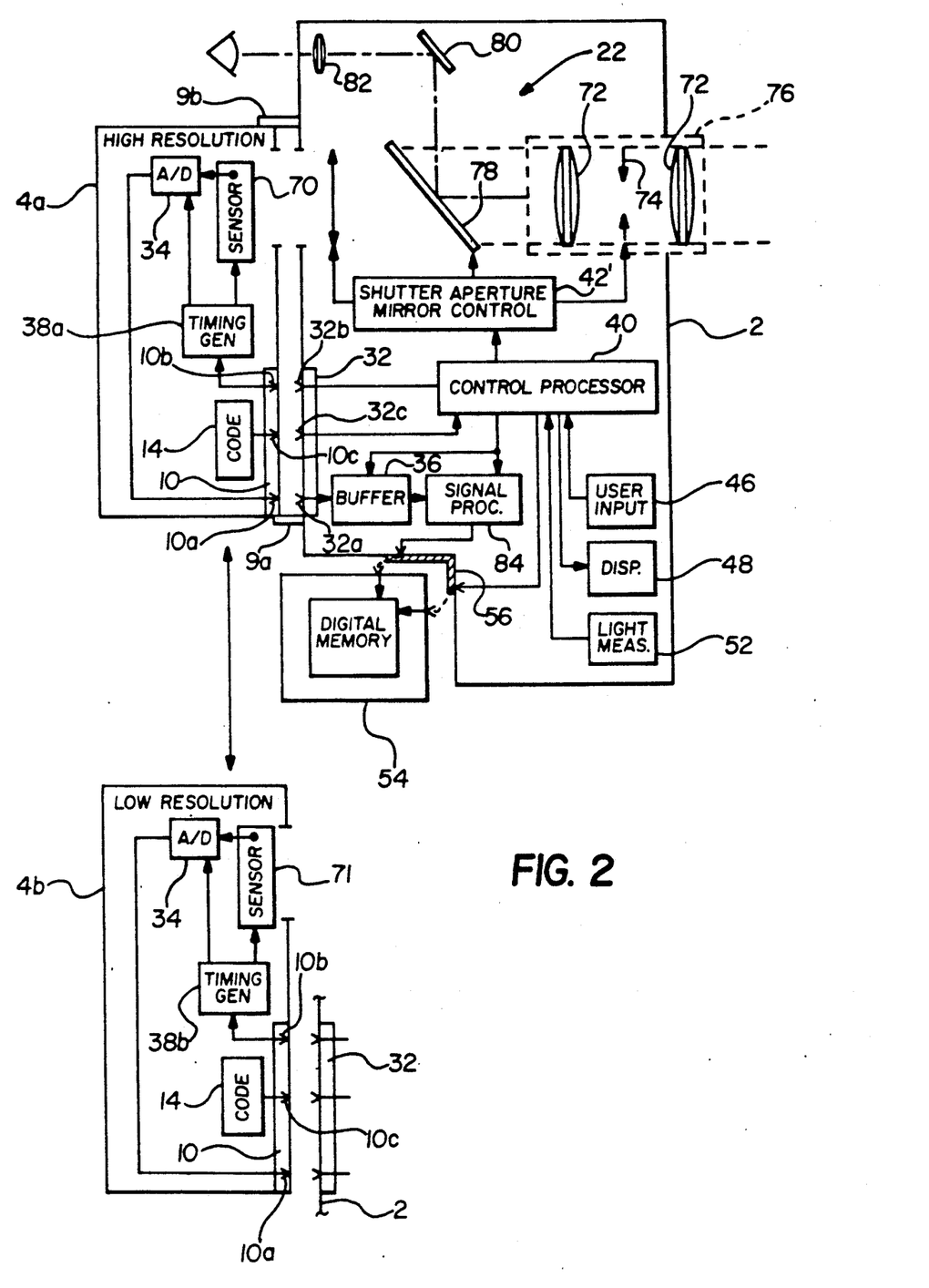
FIG. 2 is a block diagram of a second embodiment of electronic imaging apparatus partitioned according to the invention into a single lens reflex recording unit and interchangeable pickup units for acquisition of either high or low resolution images.

Besides illustrating interchangeability between high and low resolution pickup units, the second embodiment shown in FIG. 2 illustrates several other variations of the first embodiment shown in FIG. 1, generally tending to place more functional and processing capability in the image pickup unit 4a (or 4b). Inasmuch as the embodiments have many similarities, like reference characters are used in referring to similar components. The image pickup unit 4a includes a high resolution image sensor 70, such as the 2048(H) x 2048(V)-Element Full Frame CCD Imager, model KAF-4200, manufactured by the Eastman Kodak Co. The lower resolution image pickup unit 4b, on the other hand, includes a relatively lower resolution image sensor 71 such as the 1320(H) x 1035(V)-Element Full Frame CCD Imager, model KAF-1400, manufactured by the Eastman Kodak Co. In addition, the A/D converter 34 and the timing generator 38 are incorporated into the image pickup unit 4a (or 4b). (The timing generators are separately characterized as timing generators 38a and 38b to indicate that they provide different sets of signals.) The signal provided at the terminal 10a is therefore a digital image signal. Moreover, the exposure section 22 is configured in a familiar interchangeable single lens reflex design, including optics 72 and a diaphragm 74 mounted in a removable barrel 76, and a flip-up mirror 78 for diverting light via a secondary mirror 80 through a viewing lens 82.

A signal processing section 84 has been added to the second embodiment (FIG. 2) to exemplify processing of the digital signals before their transfer to the memory module 54. For example, the digital processing includes color separation, white balance, gamma correction, image compression, and so on (or some lesser combination thereof). In particular, each sensor 70 and 71 may include a color filter array (not shown separately) for color photography and the signal processing section 84 then includes the separate color filter interpolation routines necessary for the generation of color signals from the respective sensors. Alternatively, color separation may occur later in off-line processing (as will be described in connection with FIG. 5) and, accordingly, the signal processing section 84 adds a color filter identifying signal to the string of image signals in order that subsequent processing may be effected. Since compression and related processing ordinarily occur over several steps, the intermediate products of the processing algorithm may be stored in allocated space in the buffer 36 or in additional memory (not shown).

As was the case with the embodiment of FIG. 1, coding means 14 provides an identifying signal signifying the characteristics of the image sensor included in the particular image pickup unit. More specifically, the signal provided by coding means 14 signifies either the high resolution capability of the image pickup unit 4a or the lower resolution capability for the pickup unit 4b. Other processing parameters, such as the appropriate color filter interpolation routine, can also be indicated by the coding means 14. The timing generator 38a provides the appropriate vertical and horizontal clocks for executing frame transfer of the high resolution image signal while the timing generator 38b provides appropriate clocks for executing transfer of the lower resolution image.

Figure 3:
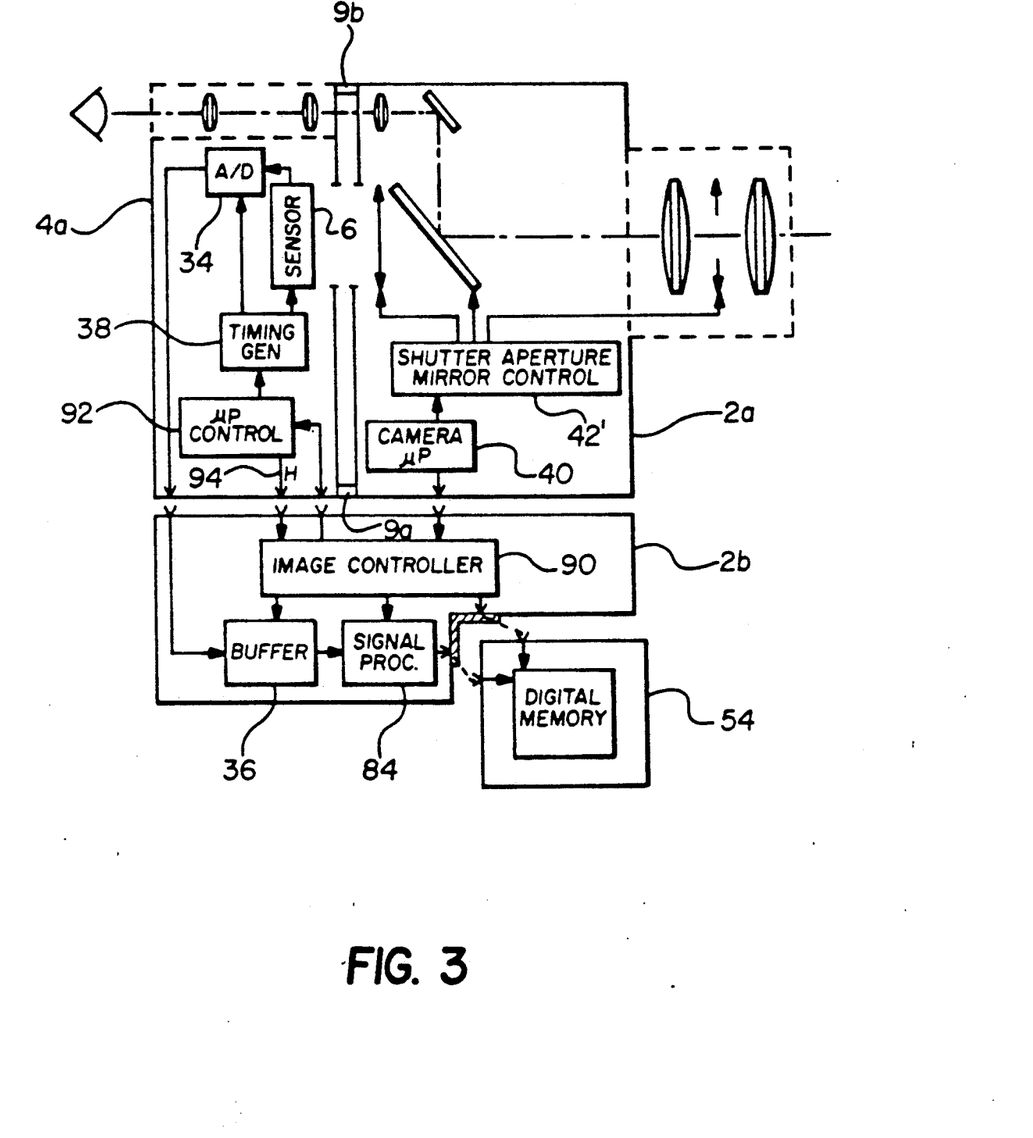
FIG. 3 is a block diagram of a third embodiment of electronic imaging apparatus partitioned according to the invention into an image recording unit, which is separable into a camera body and a processor module, and an interchangeable pickup unit.

FIG. 3 illustrates a third embodiment of the invention including further refinements. The image recording unit 2 has been further divided into two attachable units, a camera body 2a and a processor module 2b. Such a division allows the camera body 2a to be more readily adaptable for conventional silver halide (film) photography with the addition of an appropriate film back (not shown) in place of the image pickup unit 4a. The processor module 2b includes an image controller 90 that assumes control of the buffer 36, the signal processing section 84, and the memory module 54. In addition, a microprocessor controller 92 is included in the pickup unit 4a, which allows the pickup unit 4a to receive commands from the processor module 2b (e.g., indicating that the module 2b is ready to receive an image) and to issue instructions. For example, the controller 92 can issue header information on a line 94 which identifies the characteristics of the image sensor 6, the record length, the camera model/serial number, the date/time, and so on. As such, the controller 92 replaces the coding means 14 shown in FIGS. 1 and 2. Moreover, the controller 92 can perform certain image acquisition operations, such as to optionally cycle the image sensor 6 before exposure to clear the photosites or to generate a series of "reference" black and/or white frames to conceal sensor defects and to reduce noise.

Figure 4:
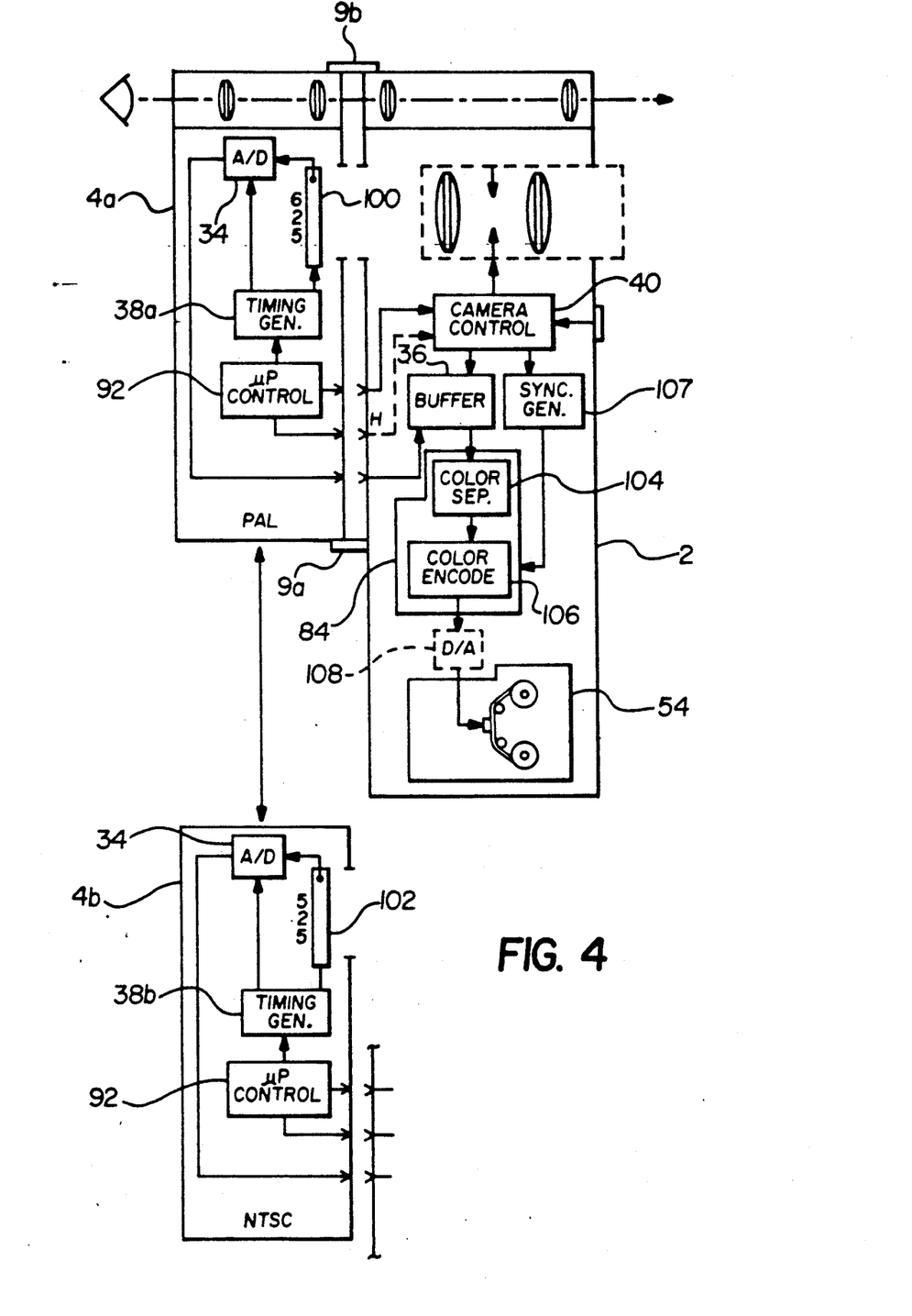
FIG. 4 is a block diagram of a fourth embodiment of electronic imaging apparatus partitioned according to the invention into a motion recording unit and interchangeable pickup units for acquisition of either PAL or NTSC signals.

The aforementioned embodiments pertain to still imaging. In FIG. 4, the image pickup unit 4a (or 4b) is cycled continuously to generate a motion signal. The pickup unit 4a includes a photosensor 100 with sufficient lines of photosites for generation of a PAL signal while the pickup unit 4b includes a photosensor 102 for generating an NTSC signal. In both cases, the microprocessor controller 92 generates a header signal (identifying the PAL or NTSC capability). The signal processing section 84 in the image recording unit 2 includes a color separation circuit 104 for interpolating color signals from the image sensor signal and a color encoding circuit 106 for generating the respective PAL or NTSC signals. The color encoding circuit 106 inserts sync signals generated by a sync generator 107. The memory module 54 includes an appropriate conventional recording mechanism (e.g., a helical tape drive) for recording the motion signals. For analog recording, a digital-to-analog converting and modulation unit 108 is included prior to the recording mechanism.

Figure 5:
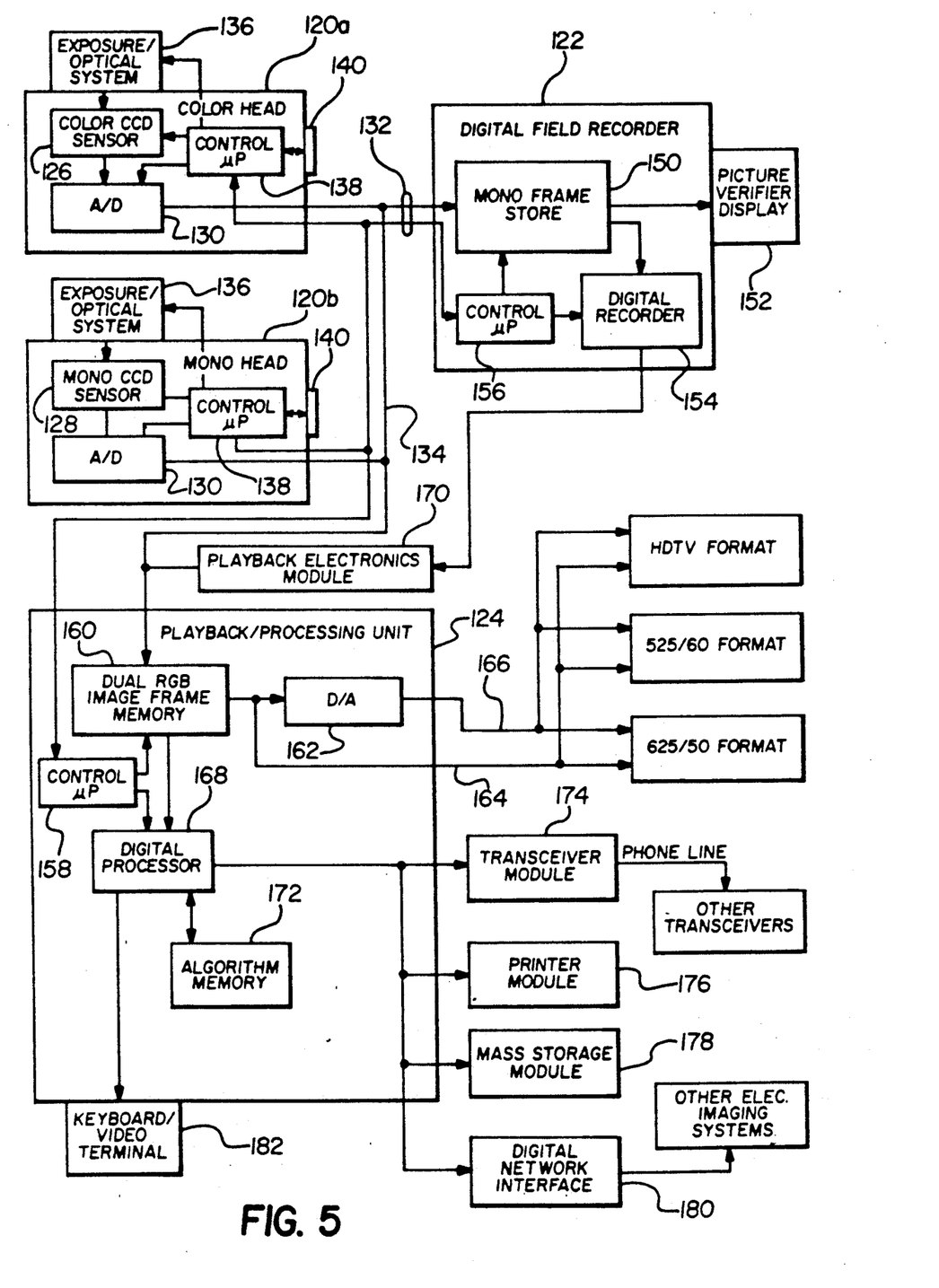
FIG. 5 is a block diagram of a fifth embodiment of electronic imaging apparatus partitioned according to the invention into interchangeable camera heads separately attachable to either a digital field recorder or to a playback/processing unit.

FIG. 5 illustrates a further variation according to the invention of the modular embodiments illustrated in FIGS. 1-4. Specifically, a digital electronic photography system is shown with three major hardware units: interchangeable camera heads 120a and 120b, a digital field recorder 122, and a playback/processing unit 124. The camera heads 120a and 120b include, respectively, a high resolution color CCD sensor 126 and a high resolution monochrome CD sensor 128. The output from each CCD sensor 126 or 128 is digitized by an A/D converter 130 and connected to either the field recorder 122 or the playback/processing unit 124 via respective digital cable interconnections 132 and 134. Each camera head 120a or 120b is a self-sufficient image acquisition unit including an optical and exposure control system 136. A microprocessor 138 controls a camera user interface 140, the optical and exposure system 136, and the generation of image signals by the respective image sensors 126 and 128. Among its functions, the microprocessor 138 provides the aforementioned header signal identifying the characteristics of the respective camera head 120a (color) or 120b (monochrome).

The digital field recorder 122 includes a single monochrome image frame memory 150 for reducing the required data rate of the digital recorder 122, as further described in U.S. Pat. No. 4,131,919. In accordance with the '919 patent, digital words representing a single optical image are loaded into the memory 150 in real time, and then transmitted to a digital recorder 154, e.g., a multi-channel linear tape recorder, at a substantially slower rate. The frame memory 150 also supplies a subsampled video signal originating with the high resolution sensors 126 or 128 to a monochrome "picture verifier" display 152, which may be attached either to the field recorder 122 or to the back of either camera head 120a or 120b. A microprocessor 156 in the field recorder controls and synchronizes the recorder 122 with the outputs of the camera heads 120a or 120b.

The playback/processing unit 124 contains an RGB dual image frame memory 160 that can be read out at high speed to a triple D/A converter 162 and a set of analog and digital outputs 164 and 166. These analog and digital outputs can be software configured to drive different component video signal formats, including "HDTV" formats, 525 line / 60 field per second (NTSC) formats, and 625 line / 50 field per second (PAL) formats. The required line interpolation is done in software. This allows the playback/processing module 124 to interface to video displays, still and motion video recorders, and color encoders for any existing video system, including NTSC, PAL and SECAM.

The memory 160 is accessed by a digital image processor 168, which performs all the digital signal processing required by the system. Such processing includes camera processing (sensor defect concealment and noise reduction, color filter interpolation, white balance and color correction, flare correction, contrast and brightness adjustments, edge enhancement, noise reduction, gamma correction, color correction for scenes, prints, transparencies or negative films, and format conversion), recorder processing (error correction decoding and error concealment), transceiver processing (data compression and format conversion and encoding), printer processing (interpolation, color and tone scale correction) and "electronic darkroom" processing (zoom, crop, combine, cut and paste, enhance, paint, alter color and tone scale).

The RGB framestore 160 in the playback/processing unit interfaces to the digital field recorder 122 via a playback electronics board 170, which includes the analog channel equalization electronics required for the digital recorder 154. The playback electronics board 170 can be an optional board inside the playback/processing module 124, an externally connected unit, or could instead be part of the digital field recorder 122. This connection allows digital images to be played back from the recorder 122, processed, and recorded again if desired. Alternately, the playback/processing unit 124 could itself contain one or two tape transports, and the image tapes could be removed from the digital field recorder 122 and inserted into a drive in the playback/processing unit 124 for playback. The playback unit also interfaces to the camera heads 120a and 120b directly, to capture monochrome, single-chip color, or color-sequential images. A control microprocessor 158 in the playback processing unit 124 controls the dual RGB image frame memory 160 and the digital processor 168 to allow storage of an image from camera heads 120a or 120b or a playback image from the digital field recorder 122. The playback unit 124 would be able to record images captured in this manner, or processed images from the field, onto the field recorder 122 as full resolution RGB images using color sequential image records.

The digital image processor 168 in the portable playback unit could be a commercial single board computer, similar to the one used in the Sun 3/110 workstation, a microprocessor or DSP chip, or a system using parallel transputers. The digital signal processing algorithm would be stored on a magnetic disk or in a ROM 172. The digital image processor 168 would interface to a number of optional modules, which could be located inside the playback/processing unit, or could be externally connected units. The interface bus could be the VME bus used in the Sun workstations or the NuBus used in the MacIntosh II family of personal computers.

A transceiver module 174 takes the compressed and formatted image data from the digital image processor 168 and modulates the image data onto a telephone line. It also demodulates images sent from other transceivers. A printer module 176 takes the image data from the digital image processor 168, which has been color and tone scale-corrected and interpolated to the correct number of pixels, and makes a hardcopy print using thermal, electrophotographic, or photographic printers. A mass memory module 178 takes the processed image data, which can be either full resolution or compressed image data, and stores it on a large memory device, such as an write-once or erasable optical disk. A digital network interface module 180 takes image data from the digital image processor 168 and converts it to the format required for standard digital network interfaces, such as Ethernet. This allows images to be transferred to and from other image processing computers which are commonly used for graphic arts, electronic publishing, medical, and scientific imaging applications.

Finally, the digital image processor interfaces to a keyboard and video terminal 182, which allows the user to control the operation of the playback/processing unit 124. Alternately, when the playback unit 124 is only required to perform a small number of tasks, the user interface 182 could be a set of hard-wired switches.

The invention has been described in detail with particular reference to a presently preferred embodiment, but it will be understood that variations and modifications can be effected within the spirit and scope of the invention. For example, the signal identifying the image pickup unit according to the characteristics of the image sensor included therewith may be provided by a manually-operated, multi-position switch 17 (FIG. 1) located on the recording unit 2 (instead of the coding means 14 in the pickup unit 4a (or 4b)). Each position of the switch would communicate corresponding sensor characteristic information to the controller 40.

What is claimed is:

1. Electronic imaging apparatus partitioned into separable modular units including an image pickup unit attachable to an image recording unit, the improvement wherein said apparatus comprises:
    a plurality of distinguishable pickup units, each such pickup unit including an image sensor having predetermined characteristics, means for providing said image sensor with a timing signal for clocking an image signal form the image sensor, and means for providing an identifying signal that identifies an image pickup unit according to the distinguishing characteristics of the image sensor included therewith; and
    said image recording unit includes means for storing the image signals, processor means for controlling the operation of the image recording unit, including the loading of the image signals into said storing means, and means responsive to said identifying signal for enabling operation of said processor means according to the sensor characteristics of the attached image pickup unit.

2. Electronic imagining apparatus as claimed in claim 1 in which the predetermined characteristics include the resolution of the image sensor.

3. Electronic imagining apparatus as claimed in claim 2 in which said storing means includes storage capacity for image signals from any of the pickup units, and said processor means controls said storing means according to the resolution of the attached pickup unit.

4. Electronic imagining apparatus as claimed in claim 1 in which the predetermined characteristics include the spectral sensitivities of the image sensor.

5. Electronic imaging apparatus as claimed in claim 4 in which said processor means modifies the image signal stored in said storing means according to the spectral sensitivity of the image sensor.

6. Electronic imaging apparatus as claimed in claim 5 in which the modification of the image signal includes separation of the image signal into separate spectral components.

7. Electronic imaging apparatus as claimed in claim 1 in which the predetermined characteristics include the light sensitivity of the image sensor.

8. Electronic imaging apparatus as claimed in claim 7 in which said processing means includes an exposure control function and in which said signal responsive means enables operation of said exposure control function according to the light sensitivity of the image sensor.

9. Electronic imaging apparatus as claimed in claim 1 in which said means for providing a timing signal comprises a timing signal generator resident in the image pickup unit.

10. Electronic imaging apparatus as claimed in claim 1 in which said image recording unit includes a timing signal generator and said means for providing a timing signal comprises means operative during attachment of said image pickup unit to said image recording unit for connecting the output of said timing signal generator to said image sensor.

11. Electronic imaging apparatus as claimed in claim 1 in which said image pickup unit includes an objective lens for forming an optical image of an object on the surface of the image sensor.

12. Electronic imaging apparatus as claimed in claim 1 in which said image recording unit includes an objective lens for forming an image of an object at a predetermined focal plane, and in which said image pickup unit positions the image sensor in the predetermined focal plane when attached to the recording unit.

13. Electronic imaging apparatus as claimed in claim 1 in which said means for providing an identifying signal comprises an electrically-sensitive coded area on said image pickup unit, and said responsive means includes an electrical pickup for engaging said coded area.

14. Electronic imaging apparatus as claimed in claim 1 in which said means for providing an identifying signal comprises means for generating a header signal identifying said characteristics, said header signal being provided to said image recording unit in combination with said image signal.

15. Electronic imaging apparatus partitioned into separable modular units including an image pickup unit and an image recording unit, the improvement wherein said apparatus comprises:
    a plurality of distinguishable pickup units, each such pickup unit including an image sensor having predetermined characteristics, and a timing circuit for clocking an image signal from the image sensor according to a predetermined clock function suitable for the characteristics of the image pickup unit;
    said image recording unit includes means for storing the image signals and a controller for loading the image signals into said storing means, said controller including a plurality of signal processing routines adapted to the particular characteristics of different image pickup units; and wherein said apparatus further includes
    interface means operative during attachment of the image pickup unit to the image recording unit for enabling a particular signal processing routine corresponding the characteristics of the attached image pickup unit.

16. Electronic imaging apparatus as claimed in claim 15 in which the predetermined characteristics include the resolution of the image sensor.

17. Electronic imaging apparatus as claimed in claim 15 in which the predetermined characteristics include the spectral sensitization of the sensor.

18. Electronic imaging apparatus as claimed in claim 17 in which the controller includes a plurality of color filter interpolation routines adapted to the spectral characteristics of the plurality of image pickup units and said interface means enables operation of the particular color filter interpolation routine corresponding to the spectral characteristics of the attached image pickup unit.

19. Electronic imaging apparatus as claimed in claim 15 in which the predetermined characteristics include the light sensitivity of the image sensor.

20. Electronic imaging apparatus as claimed in claim 19 in which said controller includes an exposure control function and in which said interface means enables operation of said exposure control function according to the light sensitivity of the image sensor.

21. Electronic imaging apparatus partitioned into separable modular units including an image pickup unit, an image recording unit, and a playback processing unit, the improvement wherein said apparatus comprises:

a plurality of distinguishable pickup units, each such pickup unit including an image sensor having predetermined characteristics, means for providing said image sensor with a timing signal for clocking an image signal from the image sensor, and means for providing a sensor identifying signal that uniquely signifies an image pickup unit according to the distinguishable characteristics of the image sensor included therewith;

said image recording unit includes means for storing the image signals, and a controller for loading the image signals into said storing means;

said playback processing unit includes a frame buffer for storing a frame of image signals and a digital processor for applying a selected algorithm to the signals; and wherein said image recording unit and said playback processing unit further include means responsive to said sensor identifying signal and operative during attachment of said image pickup unit to either said image recording unit or said playback processing unit for enabling operation of the respective unit according to the sensor characteristics of the attached image pickup unit.

22. Electronic imaging apparatus as claimed in claim 21 wherein said controller, in response to the sensor identifying signal, loads the image signals into said storing means, and wherein said playback processing unit writes said image signals from said storing means into said frame buffer and, in response to the sensor identifying signal, digitally processes the stored frame signals according to the characteristics of the image sensor.

23. Electronic imaging apparatus partitioned into separable modular units, said apparatus comprising:

a plurality of image pickup units, each pickup unit including an image sensor having predetermined characteristics and means for providing said image sensor with a timing signal for clocking an image signal from the image sensor;

an image recording unit including means for storing the image signals and processor means for controlling the operation of the image recording unit, including the loading of image signals into said storing means;

means for attaching a selected one of the pickup units to said image recording unit; and means for enabling operation of said processor means according to the sensor characteristics of the attached image pickup unit.

24. Electronic imaging apparatus as claimed in claim 23 in which said selected one of the image pickup units provides a signal identifying the image sensor included therewith and said enabling means comprises interface means operative during attachment of the selected one of the image pickup units to the image recording unit and responsive to said signal identifying the image sensor provided by said image pickup unit.

25. Electronic imaging apparatus as claimed in claim 23 in which said enabling means includes multi-position switching means located on said recording unit, each position providing the sensor characteristics of a corresponding image pickup unit to said processor means.

* * * * *